United States Patent
Santos et al.

(10) Patent No.: US 11,578,248 B2
(45) Date of Patent: Feb. 14, 2023

(54) EMULSIFIERS FOR DIRECT EMULSION DRILLING FLUIDS

(71) Applicant: Halliburton Energy Services, Inc., Houston, TX (US)

(72) Inventors: Catherine Martin Santos, Houston, TX (US); Li Guo, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 190 days.

(21) Appl. No.: 16/480,241

(22) PCT Filed: Jul. 22, 2019

(86) PCT No.: PCT/US2019/042845
§ 371 (c)(1),
(2) Date: Jul. 23, 2019

(87) PCT Pub. No.: WO2020/023398
PCT Pub. Date: Jan. 30, 2020

(65) Prior Publication Data
US 2020/0157402 A1    May 21, 2020

Related U.S. Application Data (60) Provisional application No. 62/703,572, filed on Jul. 26, 2018.

(51) Int. Cl.
*C09K 8/24* (2006.01)
*C09K 8/28* (2006.01)
*C09K 8/26* (2006.01)

(52) U.S. Cl.
CPC .............. *C09K 8/28* (2013.01); *C09K 8/265* (2013.01); *C09K 2208/06* (2013.01)

(58) Field of Classification Search
CPC ...... C09K 8/28; C09K 8/265; C09K 2208/06; C09K 2208/12; C09K 2208/34; C09K 2208/32; C09K 8/24
See application file for complete search history.

(56) References Cited

U.S. PATENT DOCUMENTS

| | | | | |
|---|---|---|---|---|
| 3,048,538 A | * | 8/1962 | Rosenberg | C09K 8/22 507/116 |
| 4,631,136 A | * | 12/1986 | Jones, III | C09K 8/34 507/138 |
| 9,896,613 B2 | | 2/2018 | Müller et al. | |
| 2009/0170730 A1 | | 7/2009 | Wu et al. | |
| 2010/0317549 A1 | | 12/2010 | Dakin et al. | |
| 2013/0303410 A1 | * | 11/2013 | Wagle | C09K 8/36 507/128 |
| 2014/0357533 A1 | * | 12/2014 | Wells | C09K 8/20 507/126 |
| 2016/0363519 A1 | * | 12/2016 | Kulkarni | G01N 11/00 |
| 2017/0204319 A1 | * | 7/2017 | McDaniel | C09K 8/32 |
| 2018/0094185 A1 | * | 4/2018 | Singh | C09K 8/035 |
| 2019/0008749 A1 | * | 1/2019 | Harris | A61K 8/731 |

FOREIGN PATENT DOCUMENTS

| | | |
|---|---|---|
| WO | 2006045456 | 5/2006 |
| WO | WO 2016/171683 | * 10/2016 |

OTHER PUBLICATIONS

International Search Report and Written Opinion for PCT/US2019/042845 dated Nov. 7, 2019.
P. Dokić and P. Sherman, Study on Thermal Induced Phase Inversion of Concentrated O/W Emulsions Stabilized by Various Tween Emulsifiers, Colloid Science, Kolloide, 1980.
Takamura, A., Minowa, T., Noro, S , & Kubo, T., Effects of Tween and Span Group Emulsifiers on the Stability of O/W Emulsions, Chemical & Pharmaceutical Bulletin, 27(12), 2921-2926. 1979.

* cited by examiner

*Primary Examiner* — Kumar R Bhushan
(74) *Attorney, Agent, or Firm* — Thomas Rooney; C. Tumey Law Group PLLC (57) ABSTRACT

A method of drilling in a subterranean formation. A method may include providing a direct emulsion drilling fluid comprising an aqueous fluid, an oil, and a polysorbate emulsifier; circulating the direct emulsion drilling fluid from a surface, through a wellbore, and back to the surface; and extending the wellbore in the subterranean formation while circulating the direct emulsion drilling fluid.

20 Claims, 3 Drawing Sheets

EMULSIFIERS FOR DIRECT EMULSION DRILLING FLUIDS

BACKGROUND

Drilling fluids are the complex fluids used for the drilling of subterranean oil and gas wells. The successful completion of an oil and gas well and production of hydrocarbons from the oil and gas reservoir depends upon, to a considerable extent, the properties of drilling fluids selected. The selection of an appropriate fluid and the maintenance of the properties primarily influence the production rate while drilling. The complex fluids perform several functions simultaneously. For example, drilling fluids clean the well; hold the cuttings in suspension; reduce friction between the drill string and sides of the well; maintain the stability of a wellbore by imposing hydrostatic pressure on the walls thereof; prevent fluid loss to the formation to avoid formation damage and differential pipe sticking by making thin, impermeable filter cakes; cool and lubricate drilling tools; and contribute to the evaluation of the formation by raising the cuttings from the wellbore bottom up to the surface of the well.

Drilling fluid density may be an important factor to monitor during drilling operations, as the hydrostatic pressure exerted by the drilling fluid is directly proportional to the density of the drilling fluid. Hydrostatic pressure may increase with increasing density of the drilling fluid and height of fluid column. Excess hydrostatic pressure above the fracture gradient of the formation may lead to premature fracturing of the formation and resultant formation damage and fluid loss.

To remedy these and other issues, lower density drilling fluids may be required. Oil may be added to a drilling fluid to reduce the density, but these systems may not be stable at static conditions. Furthermore, these systems may become increasingly unstable at high salinity, particularly in certain aqueous-based drilling fluids.

BRIEF DESCRIPTION OF THE DRAWINGS

These drawings illustrate certain aspects of some examples of the present invention and should not be used to limit or define the invention.

DETAILED DESCRIPTION

Provided are compositions and methods for a direct emulsion drilling fluid. A direct emulsion drilling fluid may also be referred to as an oil-in-water emulsion. A characteristic of a direct emulsion drilling fluid may be that the aqueous phase of the emulsion is the external phase while the oil phase is the internal phase. The direct emulsion drilling fluid may be used during a wellbore drilling operation to aid in the creation and extension of a wellbore through a subterranean formation. Generally, it may be desirable to keep the subterranean formation in a water-wet condition where a thin film of water may coat the surface of the subterranean formation matrix. A water-wet condition may allow for more efficient hydrocarbon transport than where the subterranean formation is in an oil-wet condition. A direct emulsion drilling fluid may provide certain benefits to drilling in formations where a relatively lower density drilling fluid is desired. A direct emulsion drilling fluid may be mixed to a variety of densities appropriate for a particular application.

Conversely, an invert emulsion drilling fluid refers to an oil-based mud, wherein the terms may be considered synonymous. Invert emulsion muds may include from 5% up to 50% water in the liquid phase. For example, in an invert emulsion, water droplets may be dispersed in a continuous phase of oil. Hence, direct emulsion may refer to an oil-containing drilling fluid or mud, wherein the oil becomes the dispersed phase and water becomes the continuous phase; whereas invert emulsion mud may be defined as oil-based drilling fluids or mud to which water is added, wherein oil becomes the continuous phase.

In some structurally weaker formations such as formations that include a higher salt or other dissolvable species content, unconsolidated formations, and formations with a relatively low fracture gradient, conventional drilling fluids may damage the wellbore and subterranean formation. Damage to the formation may include any range of damage from small amounts of washout or removal of wellbore surface material beyond the size of the drill bit up to and including wellbore collapse. A particular challenge in extending a wellbore through a subterranean formation including a relatively high amount of water-soluble species is that a water-based drilling fluid may solvate the soluble species and remove them from the formation and wellbore surface. The water-soluble species may then be moved from the wellbore as the drilling fluid flows back up the annulus. In applications such as drilling though a salt dome, a saturated brine-based drilling fluid may be used to minimize the amount of salt removed. In some salt dome drilling applications, the only safe way to drill is with a saturated brine fluid.

In general, salt containing aqueous fluids such as saturated and unsaturated brines may have a relatively higher density than pure water. Drilling through a subterranean formation with a relatively denser saturated brine containing drilling fluid may present challenges such as increased hydrostatic pressure and increased equivalent circulating. A relatively higher density drilling fluid may prematurely fracture the subterranean formation due to the higher hydrostatic pressure associated with denser fluids. Additionally, relatively denser fluids may require a higher horsepower to pump than relatively less dense fluids. Additional horsepower may become cost prohibitive at higher volumetric flow rates. In some conventional drilling operations, water or oil may be added to a drilling fluid to decrease the density. In applications where a saturated brine is required, the density typically cannot be decreased with water as the brine would not remain saturated. In such applications, an oil may be used to reduce the density. Such oil and water systems may stratify rapidly, even when an emulsifier is used. Such systems may need to be pumped at high velocities so that turbulent mixing keeps the oil and water emulsified. High velocities again may require even higher horsepower requirements and may lead to a variety of other adverse conditions such as jetting from the drill head which may damage the formation. Additionally, the oil in water emulsion drilling fluids are typically continuously agitated at the surface or phase separation may occur. As such, saturated brine direct emulsion drilling fluids may not be well suited for storing for an extended period and may require additional surface equipment to prepare and use.

The direct emulsion drilling fluid may include an aqueous-based fluid, such as freshwater, brine, an oil and a polysorbate emulsifier. The brine may be from any source provided that it does not contain an excess of compounds that may undesirably affect other components in the direct emulsion drilling fluid. For example, the direct emulsion drilling fluid may include a saturated brine including water and a salt. Seawater or other brines may be suitable for use in some examples. The brines may include monovalent or divalent salts such as, without limitation, at least one salt selected from the group consisting of sodium chloride, sodium bromide, potassium bromide, potassium chloride, magnesium chloride, calcium chloride, calcium bromide, potassium formate, cesium formate, lithium chloride, lithium bromide sodium formate, lithium formate, ammonium chloride, organic cation salts such as tetramethyl ammonium chloride, choline chloride, or mixtures thereof, among others.

Further, the brine may be present in an amount sufficient to form a pumpable slurry. The salt may be present in the brine in any amount to form a saturated solution or supersaturated solution. For example, the salt may be provided in an amount of about 1% to about 50% by weight of the brine. Alternatively, about 1% to about 5% by weight, about 5% to about 10% by weight, about 10% to about 15% by weight, about 15% to about 20% by weight, about 20% to about 25% by weight, about 25% to about 30% by weight, about 30% to about 35% by weight, about 35% to about 40% by weight, about 40% to about 45% by weight, about 45% to about 50% by weight, or about 10% to about 30% by weight.

The aqueous-based fluid may be present in the direct emulsion drilling fluid at a volume ration of about 10 vol % aqueous-based fluid up to 80 vol % aqueous-based fluid. Alternatively, the aqueous-based fluid may be present in the direct emulsion drilling fluid at a volume ratio of from about 10 vol % aqueous-based fluid up to about 30 vol % aqueous-based fluid, from about 30 vol % aqueous-based fluid up to about 40 vol % aqueous-based fluid, from about 40 vol % aqueous-based fluid up to about 50 vol % aqueous-based fluid, from about 50 vol % aqueous-based fluid up to about 60 vol % aqueous-based fluid, from about 60 vol % aqueous-based fluid up to about 70 vol % aqueous-based fluid, or from about 70 vol % aqueous-based fluid up to about 80 vol % aqueous-based fluid.

The direct emulsion drilling fluid may include, for example, any number or variety of oils. Examples of suitable oils that may be included in the direct emulsion drilling fluid may include, but are not limited to at least one oil selected from the group consisting of an α-olefin, internal olefin, alkane, aromatic hydrocarbon, cycloalkane, liquefied petroleum gas, kerosene, diesel oil, crude oil, gas oil, fuel oil, paraffin oil, mineral oil, light cycle oil, tall oil, refined oil, low-toxicity mineral oil, olefin, ester, amide, synthetic oil (e.g., polyolefin), polydiorganosiloxane, siloxane, organosiloxane, ether, dialkylcarbonate, vegetable oil, and combinations thereof.

The oil may be present in the direct emulsion drilling fluid at a volume ratio of about 20 vol % oil up to 90 vol % oil. Alternatively, the oil may be present in the direct emulsion drilling fluid at a volume ratio of from about 20 vol % oil up to about 30 vol % oil, from about 30 vol % oil up to about 40 vol % oil, from about 40 vol % oil up to about 50 vol % oil, from about 50 vol % oil up to about 60 vol % oil, from about 60 vol % oil up to about 70 vol % oil, from about 70 vol % oil up to about 80 vol % oil, or from about 80 vol % oil up to about 90 vol % oil. For volumes of oil above 50% the direct emulsion drilling fluid may still be considered a direct emulsion even though the volume of oil may be present in an amount greater than the water because the polysorbate emulsifier allows the water to remain at the continuous phase thereby keeping the direct emulsion drilling fluid water-wetting.

There may be several challenges with using a direct emulsion drilling fluid such as emulsion stability and wettability problems, among others. When the direct emulsion drilling fluid is mixed, the emulsion may become unstable and stratify into layers of aqueous phase and oil phase. At certain ratios of oil and water, the direct emulsion drilling fluids may become oil wetting instead of water wetting. However, the addition of a polysorbate emulsifier to the direct emulsion drilling fluid may be used to stabilize an oil and water emulsion system. Polysorbate emulsifiers are emulsifiers derived from ethoxylated sorbitan esterified with fatty acids. A general formula for a polysorbate emulsifier is shown below:

The polysorbate may be named according to the following general formula polyoxyethylene (m) sorbitan-(n) where m represents the number of oxyethylene —$(CH_2CH_2O)$— groups present in the molecule. In the polysorbate above, $m=w+x+y+z$. Moreover, in the polysorbate above, n represents the number of ethyl groups present in the fatty acid esterified with the sorbitan. Some specific examples of fatty acids may include, without limitation, carboxylic acids with 4 carbon atoms to 28 carbon atoms, such as caprylic acid, capric acid, lauric acid, muriatic acid, palmitic acid, stearic acid, arachidic acid, behenic acid, lignoceric acid, cerotic acid, oleic acid, and others well known in the art. Some specific examples of polysorbates may include, but are not limited to, polyoxyethylene (20) sorbitan monolaurate, polyoxyethylene (20) sorbitan monopalmitate, polyoxyethylene (20) sorbitan monostearate, and polyoxyethylene (20) sorbitan monooleate. Additionally, depending upon the process requirements, the polysorbate emulsifier may have a low molecular weight, with a total molecular weight of less than about 1000; a medium molecular weight, with a total molecular weight of about 1000 to about 10,000; or a high molecular weight, with a total molecular weight of about 10,000 to over one million.

The polysorbate emulsifier may be present in the direct emulsion drilling fluid in any amount suitable for a particular application. For example, the polysorbate emulsifier may be present in an amount of about 0.10 lb/bbl (pounds per barrel) (0.3 kg/m$^3$) up to about 15 lb/bbl (438 kg/m$^3$). Alternatively, the polysorbate emulsifier may be present in the direct emulsion drilling fluid in an amount of about 0.10 lb/bbl (pounds per barrel) (0.3 kg/m$^3$) up to about 0.5 lb/bbl (1.4 kg m$^3$), about 0.5 lb/bbl (1.4 kg/m$^3$) up to about 2.5 lb/bbl (7 kg/m$^3$), about 2.5 lb/bbl (7 kg/m$^3$) up to about 4 lb/bbl (11 kg m$^3$), about 4 lb bbl (11 kg/m$^3$) up to about 10 lb/bbl (29 kg/m$^3$), or about 10 lb/bbl (29 kg/m$^3$) up to about 15 lb/bbl (43 kg/m$^3$).

The direct emulsion drilling fluid may generally have a density suitable for a particular application. By way of example, the direct emulsion drilling fluid may have a density of about 7 pounds per gallon ("lb/gal") (8398 kg/m$^3$) up to about 20 lb/gal (2397 kg/m$^3$). Alternatively, the direct emulsion drilling fluid may have a density of about 7 lb/gal (8398 kg/m$^3$) to about 12 lb/gal (1438 kg/m$^3$), about (1438 kg/m$^3$) to about 15 lb/gal (1797 kg/m$^3$), or about 15 lb/gal (1797 kg/m$^3$) to about 20 lb/gal (2397 kg/m$^3$). Embodiments of the direct emulsion drilling fluid may include other means to reduce their densities, such as hollow microspheres, low-density elastic beads, or other density-reducing additives known in the art. In some embodiments, the density may be reduced during production of the direct emulsion drilling fluid prior to placement in a subterranean formation.

The density of a particular direct emulsion drilling fluid may be directly affected by the ratio of oil to aqueous-base fluid, generally referred to herein as oil-to-water or "O/W", in the direct emulsion drilling fluid. The aqueous-base fluid may be present as the continuous phase while the oil may be in the dispersed phase. Any suitable ratio of oil-to-water may be used to form the direct emulsion drilling fluid to achieve any desired density. For example, the O/W ration may be 90:10 to 20:80. Alternatively, the O/W ratio may be 90:10 to 80:20, 80:20 to 70:30, 70:30 to 60:40; 60:40 to 50:50, 50:50 to 40:60, 40:60 to 30:70, or 30:70 to 20:80.

The direct emulsion drilling fluid may further include a viscosifying polymer. The viscosifying polymer may be present in the direct emulsion drilling fluid in any amount suitable for a particular application. For example, the viscosifying polymer may be present in an amount of about 0.10 lb/bbl (pounds per barrel) (0.3 kg/m$^3$) to about 10 lb/bbl (29 kg/m$^3$). Alternatively, the viscosifying polymer may be present in the direct emulsion drilling fluid in an amount of about 0.10 lb/bbl (pounds per barrel) (0.3 kg/m$^3$) to about 0.5 lb/bbl (1.4 kg/m$^3$), about 0.5 lb/bbl (1.42 kg/m$^3$) to about 2.5 lb/bbl (7 kg/m$^3$), about 2.5 lb/bbl (7 kg/m$^3$) to about 4 lb/bbl (11 kg/m$^3$), or about 4 lb/bbl (11 kg/m$^3$) to about 10 lb/bbl (29 kg/m$^3$). Additionally, the viscosifying polymer may have any mean particle size range deemed suitable for the specific application. For example, viscosifying polymer may have a mean particle size of about 100 nanometers to about 500 microns. Alternatively, the mean particle size may be about 100 nanometers to about 500 nanometers, about 500 nanometers to about 1 micron, about 1 micron to about 100 microns, about 100 microns to about 250 microns, or about 250 microns to about 500 microns.

The direct emulsion drilling fluid may include a weighting agent such as barite, hematite, calcium, carbonate, siderite, ilmenite, or combinations thereof. The weighting agent may be used to increase the density of the drilling fluid. More specifically, the weighting agent may have a specific gravity suitable for a particular application, such as, without limitation, about 156 lb/ft$^3$ (2.5 g/cm$^3$) to about 343 lb/ft$^3$ (5.5 g/cm$^3$). Alternatively, the specific gravity of the weighting agent may be about 156 lb/ft$^3$ (2.5 g/cm$^3$) to about 219 lb/ft$^3$ (3.5 g/cm$^3$), about 219 lb/ft$^3$ (3.5 g/cm$^3$) to about 281 lb/ft$^3$ (4.5 g/cm$^3$), or about 281 lb/ft$^3$ (4.5 g/cm$^3$) to about 343 lb/ft$^3$ (5.5 g/cm$^3$).

The direct emulsion drilling fluid may further include a clay such as any one of: hectorite, metakaolin, attapulgite, smectites, iolites, sepiolite, or combinations thereof. The clay may be present in the direct emulsion drilling fluid in any amount suitable for a particular application such as, without limitation, in an amount of about 1 lb/bbl (2.9 kg/m$^3$) to about 20 lb/bbl (57 kg/m$^3$). Alternatively, the clay may be present in the direct emulsion in an amount of about 1 lb/bbl (3 kg/m$^3$) to about 3 lb/bbl (9 kg/m$^3$), about 3 lb/bbl (9 kg/m$^3$) to about 8 lb/bbl (23 kg/m$^3$), about 8 lb/bbl (23 kg/m$^3$) to about 15 lb/bbl (43 kg/m$^3$), or about 15 lb/bbl (43 kg/m$^3$) to about 20 lb/bbl (57 kg/m$^3$).

Moreover, the direct emulsion drilling fluid may further include any drilling fluid additives such as, without limitations, pH buffers or control agents, shale inhibitors, corrosion inhibitors, scale inhibitors, degreasers, wetting agents, emulsifiers, filtrate control agents, lost circulation materials, lubricants, rate of penetration enhancers, spotting fluids, sweeping agents, thinners, deflocculants, suspending agents, and combinations thereof. The direct emulsion drilling fluid may include fluid loss additives such as, for example, lignin, lignite, lignin sulfonate, carbon-based fluid loss additives such as asphalt and asphaltenes, and combinations thereof.

The direct emulsion drilling fluids may have a pH suitable for a particular application. Generally, the pH of a direct emulsion drilling fluid may be basic, i.e., pH of greater than 7 at room temperature (about 70° F. (21° C.)). Particularly, the direct emulsion drilling fluid may have a pH of about pH 7 to about pH 13, about pH 7 to about pH 8.5, about pH 8.5 to about pH 9.5, about pH 9.5 to about pH 11, or about pH 11 to about pH 13. The pH of a drilling fluid may be raised by the addition of a hydroxide releasing agent such as caustic soda or a buffer compound.

The direct emulsion drilling fluid may be prepared by any means, such as batch mixing or continuous mixing. For example, all components of the direct emulsion drilling fluid, including aqueous fluid, such as water or brine, oil, polysorbate emulsifier, and additives, may be added to a batch mixer and agitated until the desired amount of mixing is achieved. Alternatively, the direct emulsion drilling fluid may be added to a continuous mixer where components are metered in and a product of direct emulsion drilling fluid is continuously withdrawn. The direct emulsion drilling fluid may be mixed at elevated temperatures to aid in blending of the components and to produce a direct emulsion drilling fluid with desired viscosity, and other fluid properties. For example, the direct emulsion drilling fluid may be prepared at a temperature range of about 150° F. (38° C.) to about 200° F. (93° C.), about 150° F. (38° C.) to about 165° F. (74° C.), about 165° F. (74° C.) to about 175° F. (79° C.), or from 175° F. (79° C.) to about 200° F. (93° C.).

Figure 1:
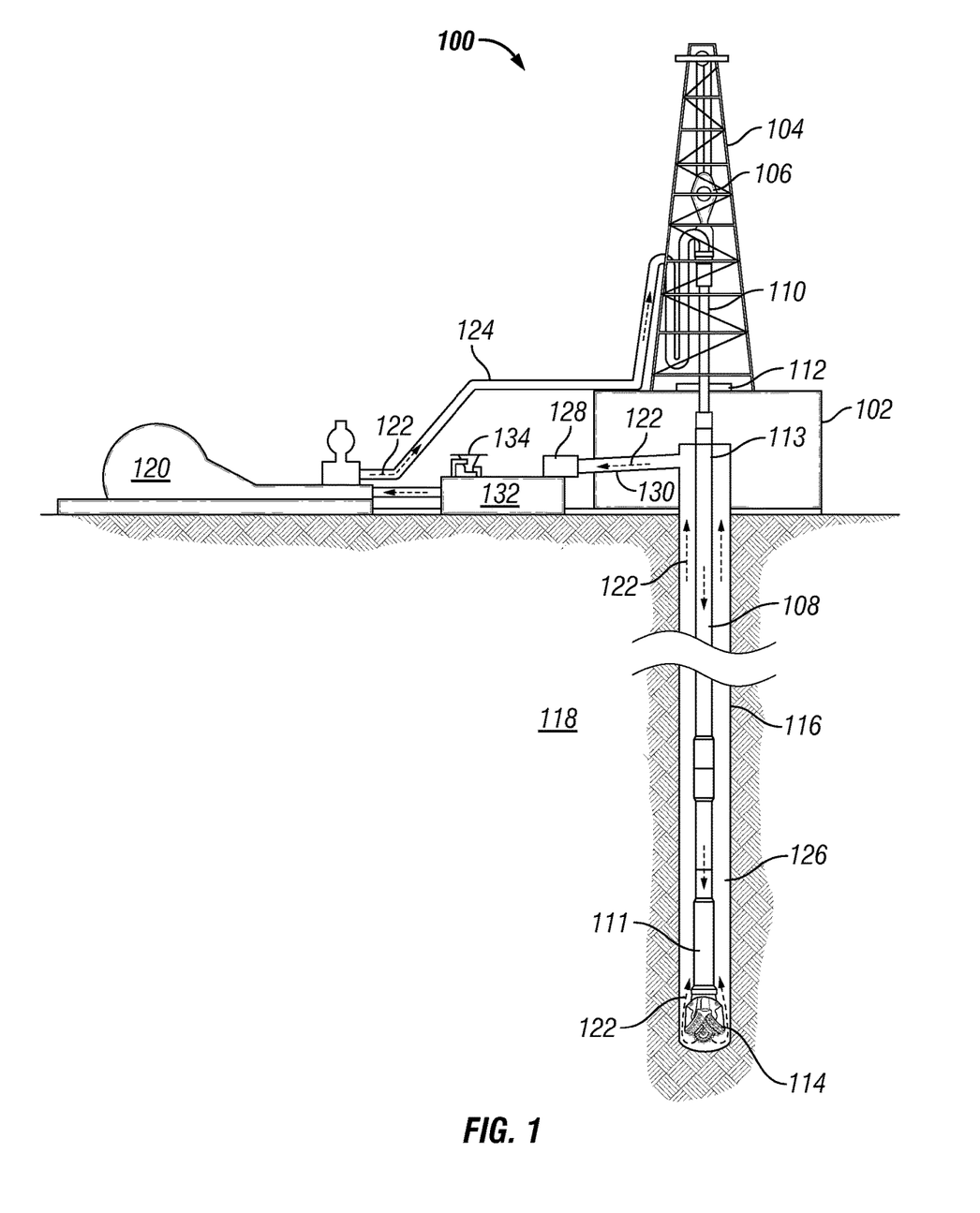
FIG. 1 is a schematic diagram of an example drilling assembly.

FIG. 1 illustrates an exemplary drilling assembly 100 in which a drilling fluid 122, such as a direct emulsion drilling fluid comprising a polysorbate emulsion, may be used. It should be noted that while FIG. 1 generally depicts a land-based drilling assembly, the principles described herein are equally applicable to subsea drilling operations that employ floating or sea-based platforms and rigs, without departing from the scope of the disclosure.

As illustrated, the drilling assembly 100 may include a drilling platform 102 that may support a derrick 104 having a traveling block 106 for raising and lowering a drill string 108, wherein the drill string 108 may have a proximal end 113 and a distal end 111. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end 111 of the drill string 108, wherein the drill bit 114 may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that may penetrate various subterranean formations 118.

Drilling fluid 122 including an aqueous fluid, wherein the aqueous fluid may be water or brine, oil, polysorbate emulsifier, and additives may be prepared. A pump 120, such as a mud pump, may circulate drilling fluid 122 through a feed pipe 124 and to the kelly 110, which conveys the drilling fluid 122 downhole through the interior of the drill string 108 and through one or more orifices in the drill bit 114. The drilling fluid 122 may then be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but may not limited to, one or more of a shaker, wherein the shaker may be a shale shaker, for example, a centrifuge, a hydrocyclone, a separator (including magnetic and electrical separators), a desilter, a desander, a separator, a filter, wherein the filter may be a diatomaceous earth filter, for example, a heat exchanger, and/or any fluid reclamation equipment. The fluid processing unit(s) 128 may further include one or more sensors, gauges, pumps, compressors, and the like, used store, monitor, regulate, and/or recondition the drilling fluid 122.

After passing through the fluid processing unit(s) 128, a "cleaned" drilling fluid 122 may be deposited into a nearby retention pit 132, wherein the retention pit may be a mud pit, for example. While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While FIG. 1 shows only a single retention pit 132, there may be more than one retention pit 132, such as multiple retention pits 132 in series. Moreover, the retention pit 132 may be representative of one or more fluid storage facilities and/or units where the drilling fluid additives may be stored, reconditioned, and/or regulated until being added to the drilling fluid 122.

The exemplary drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. Moreover, the disclosed drilling fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors, wherein the motors may be topside or downhole motors, for example, used to drive the drilling fluids into motion, any valves or related joints used to regulate the pressure or flow rate of the drilling fluids, and any sensors, such as pressure sensors or temperature sensors, gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats, such as shoes, collars, or valves, for example, logging tools and related telemetry equipment, actuators, such as electromechanical devices, for example, hydromechanical devices, etc.), sliding sleeves, production sleeves, plugs, screens, filters, flow control devices, such as inflow control devices, autonomous inflow control devices, or outflow control devices, for example, couplings, wherein the couplings may include electro-hydraulic wet connect, dry connect, or inductive coupler, for example, control lines, such as electrical lines, fiber optic lines, or hydraulic lines, for example, surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, this disclosure describes compositions for direct emulsion drilling fluids and methods of use thereof in subterranean formations. Without limitation, the compositions and methods may further be characterized by one or more of the following statements:

Statement 1. A method of drilling in a subterranean formation comprising: providing a direct emulsion drilling fluid comprising an aqueous-based fluid, an oil, and a polysorbate emulsifier; circulating the direct emulsion drilling fluid from a surface, through a wellbore, and back to the surface; and extending the wellbore in the subterranean formation while circulating the direct emulsion drilling fluid.

Statement 2. The method of Statement 1, wherein the circulating comprise exiting the direct emulsion drilling fluid through an annulus and circulating the direct emulsion drilling fluid to one or more fluid processing units, wherein the fluid processing units comprise at least one fluid processing unit selected from the group consisting of a shaker, a centrifuge, a hydrocyclone, a separator, a heat exchanger, fluid reclamation equipment, and combinations thereof.

Statement 3. The method of Statement 1 or 2, further comprising depositing the direct emulsion drilling fluid into a retention pit, wherein the retention pit comprises a mud pit.

Statement 4. The method of any of the preceding Statements, wherein the direct emulsion drilling fluid further comprises at least one additive selected from the group consisting of a lubricant, a corrosion, inhibitor a shale inhibitor, a scale inhibitor, and combinations thereof.

Statement 5. The method of any of the preceding Statements, wherein the aqueous-based fluid comprises a brine composition, wherein the brine composition comprises at least on salt selected from the group consisting of sodium chloride, sodium bromide, potassium bromide, potassium chloride, magnesium chloride, calcium chloride, calcium bromide, potassium formate, cesium formate, lithium chloride, lithium bromide sodium formate, lithium formate, ammonium chloride, tetramethyl ammonium chloride, choline chloride, and mixtures thereof.

Statement 6. The method of any of the preceding Statements, wherein the oil comprises at least one oil selected from the group consisting of an α-olefins, internal olefin, alkane, aromatic hydrocarbon, cycloalkane, liquefied petroleum gas, kerosene, diesel oil, crude oil, gas oil, fuel oil, paraffin oil, mineral oil, light cycle oil, tall oil, refined oil, low-toxicity mineral oil, olefin, ester, amide, synthetic oil, polydiorganosiloxane, siloxane, organosiloxane, ether, dialkylcarbonate, vegetable oil, and combinations thereof.

Statement 7. The method of any of the preceding Statements, wherein the polysorbate emulsifier comprises at least one group selected from the group consisting of an alkyl group, an aryl group, and combinations thereof, and wherein the alkyl group or aryl group comprise at least one group selected from the group consisting of a methyl group, an ethyl group, a propyl group, hydroxyethyl group, a hydroxypropyl group, a tolyl group, a xylyl group, a naphthyl substituent, and combinations thereof.

Statement 8. The method of any of the preceding Statements, wherein the direct emulsion drilling fluid comprises about 0.1 lb/bbl up to about 15 lb/bbl of the polysorbate emulsifier.

Statement 9. The method of any of the preceding Statements, wherein the direct emulsion drilling fluid has a ratio of the oil to the aqueous-based fluid of about 90:10 to about 20:80.

Statement 10. The method of Statement 9, wherein the direct emulsion drilling fluid has a ratio of the oil to the aqueous-based fluid of about 80:20 to about 50:50.

Statement 11. The method of any of the preceding Statements, wherein the polysorbate emulsifier is selected from the group consisting of polyoxyethylene (20) sorbitan monolaurate, polyoxyethylene (20) sorbitan monopalmitate, polyoxyethylene (20) sorbitan monostearate, and polyoxyethylene (20) sorbitan monooleate, and combinations thereof.

Statement 12. The method of any of the preceding Statements, wherein the polysorbate emulsifier comprises a total molecular weight of less than about 1000.

Statement 13. A direct emulsion drilling fluid comprising: an aqueous-based fluid; a viscosifier; a clay; an oil; a polysorbate emulsifier; and a weighting agent Statement 14. The direct emulsion drilling fluid of Statement 13, wherein the aqueous fluid comprises a brine composition, wherein the brine composition comprises monovalent or divalent salts, wherein the salts comprise at least one salt selected from the group consisting of sodium chloride, sodium bromide, potassium bromide, potassium chloride, magnesium chloride, calcium chloride, calcium bromide, potassium formate, cesium formate, lithium chloride, lithium bromide sodium formate, lithium formate, ammonium chloride, tetramethyl ammonium chloride, choline chloride, and mixtures thereof.

Statement 15. The direct emulsion drilling fluid of Statement 13 or 14, wherein the oil comprises at least one oil selected from the group consisting of an α-olefins, internal olefin, alkane, aromatic hydrocarbon, cycloalkane, liquefied petroleum gas, kerosene, diesel oil, crude oil, gas oil, fuel oil, paraffin oil, mineral oil, light cycle oil, tall oil, refined oil, low-toxicity mineral oil, olefin, ester, amide, synthetic oil, polydiorganosiloxane, siloxane, organosiloxane, ether, dialkylcarbonate, vegetable oil, and combinations thereof.

Statement 16. The direct emulsion drilling fluid of any one of Statements 13 through 15, wherein the polysorbate emulsifier comprises at least one group selected from the group consisting of an alkyl group, an aryl group, and combination thereof, and wherein the alkyl group or aryl group comprise at least one group selected from the group consisting of a methyl group, an ethyl group, a propyl group, hydroxyethyl group, a hydroxypropyl group, a tolyl group, a xylyl group, a naphthyl substituent, and combinations thereof.

Statement 17. The direct emulsion drilling fluid of any one of Statements 13 through 16, wherein the polysorbate emulsifier is selected from the group consisting of polyoxyethylene (20) sorbitan monolaurate, polyoxyethylene (20) sorbitan monopalmitate, polyoxyethylene (20) sorbitan monostearate, and polyoxyethylene (20) sorbitan monooleate, and combinations thereof.

Statement 18. The direct emulsion drilling fluid of Statements 13-17, wherein the direct emulsion has a ratio of the oil to the aqueous-based fluid of 90:10 to 20:80.

Statement 19. A direct emulsion drilling fluid comprising: an aqueous-based fluid, wherein the aqueous-based fluid is present in an amount of about 20% by volume up to about 90% by volume; a viscosifier, wherein the viscosifier is present in an amount of about 0.1 lb/bbl up to about 10 lb/bbl; a clay, wherein the clay is present in an amount of about 1 lb/bbl up to about 20 lb/bbl; an oil, wherein the oil is present in an amount of about 20% by volume up to about 90% by volume; a polysorbate emulsifier, wherein the polysorbate emulsifier is present in an amount of about 0.1 lb/bbl up to about 15 lb/bbl; and a weighting agent.

Statement 20. The direct emulsion drilling fluid of Statement 19, wherein the polysorbate emulsifier is selected from the group consisting of polyoxyethylene (20) sorbitan monolaurate, polyoxyethylene (20) sorbitan monopalmitate, polyoxyethylene (20) sorbitan monostearate, and polyoxyethylene (20) sorbitan monooleate, and combinations thereof.

EXAMPLES

To facilitate a better understanding of the disclosure, the following examples of certain aspects of some embodiments are given. In no way should the following examples be read to limit, or define, the entire scope of the embodiments.

A direct emulsion drilling fluid was formulated as shown in Table 1 and subjected to various tests. The direct emulsion drilling fluids were prepared at 60:40 and 50:50 oil to water ratios. The fluids were mixed using a multimixer and hot rolled for 16 hours at 200° F. (93° C.). After hot rolling, the fluids were static aged for 24 hours and evaluated for stability. The emulsifier was provided at various concentrations to determine compatibility and stability of the fluids. It was observed that rheology remained relatively stable after hot rolling and static aging. The plastic viscosity values ("PV") were observed to be within acceptable ranges, with PV values less than 30 cP. The electrical stability ("ES") test for water wettability was observed to correspond to a stable water-wet system for each fluid. It was further observed that there was no phase stratification after hot rolling and static aging. All the fluids tested at the various concentrations indicate water-wet fluids.

TABLE 1

| O/W | 60:40 | 50:50 |
|---|---|---|
| Mud Wt., lb/gal (kg/m³) | 5.80 (6954.94) | 8.90 (1066.46) |
| 10 lb/gal (kg/m³) NaCl brine, lb/bbl (kg/m³) | 184.60 (526.67) | 230.0 (656.19) |
| Base, lb/bbl (kg/m³) | 0.20 (0.57) | |
| Viscosifier, lb/bbl (kg/m³) | 0.40 (1.14) | 0.25 (.71) |
| pH buffer, lb/bbl (kg/m³) | 1.25 (3.57) | |
| Fluid loss additive, lb/bbl (kg/m³) | 2.0 (5.7) | |
| Polysorbate emulsifier, lb/bbl (kg/m³) | 0.50 (1.43), 2.50 (7.13), 4.0 (11.4) | 2.0 (5.7), 4.0 (11.4) |
| clay, lb/bbl (kg/m³) | 8.0 (22.8) | |
| Diesel, lb/bbl (kg/m³) | 157.35 (448.92) | 130.2 (371.56) |

TABLE 2

| | Stability Measurements | | | | |
|---|---|---|---|---|---|
| | 60/40 | | | 50/50 | |
| Emulsifier concentration, lb/bbl (kg/m$^3$) | 2.0 (5.7) | 4.0 (11.4) | 6.0 (17.1) | 2.0 (5.7) | 4.0 (11.4) |
| After hot roll, (16 h, 200° F. (93° C.)) | No separation | No separation | No separation | No separation | No separation |
| After static aging (24 h, 200° F. (93° C.)) | <3 vol % brine separation | No separation | No separation | No separation | No separation |

Stability testing results for embodiments of 60:40 and 50:50 O/W direct emulsion fluids are shown in Table 2. Stability testing was performed to evaluate the ability of the emulsifier to form tight emulsions, wherein tight emulsions comprise small and closely distributed droplets, thereby resulting in an emulsion that may be difficult to break. The test was conducted by performing a visual observation of the fluid after 16 hours and hot rolling at 200° F. (93.33 C), and after 24 hours static aging also at the same temperature of 200° F. (93.33 C). A fluid may be considered stable when brine or oil separation is <3% of the total fluid volume. All tested fluids remained stable for both the after hot roll and after static aged samples. Therefore, it was determined that the emulsifier formed tighter emulsions, which may subsequently result in more homogeneous and stable fluids.

Figure 2A:
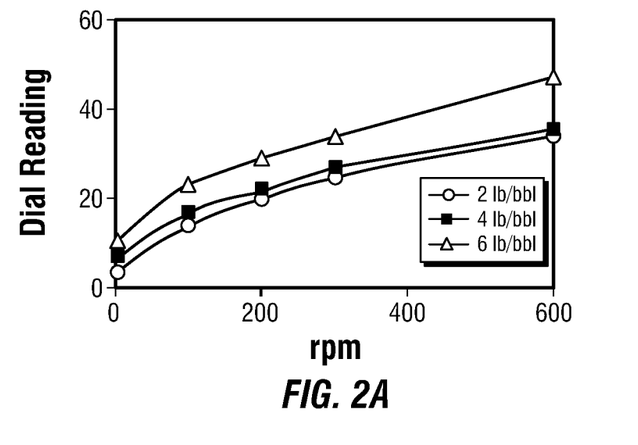
FIGS. 2A-2D depict the results of fluid testing using a disclosed direct emulsion drilling fluid comprising polysorbate at a 60:40 oil to water (O/W) ratio.
Figure 2B:
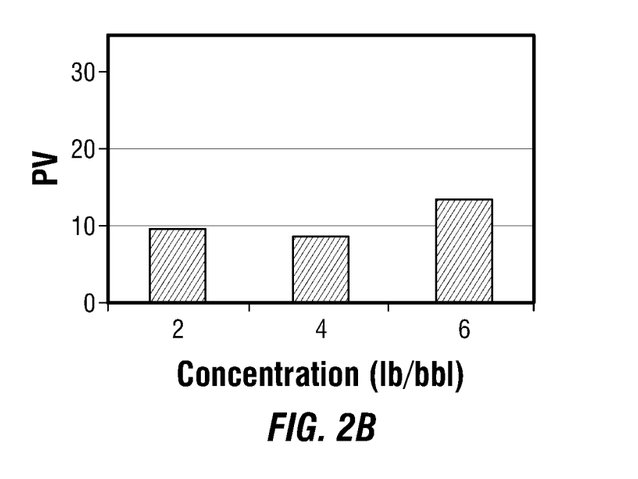
Figure 2C:
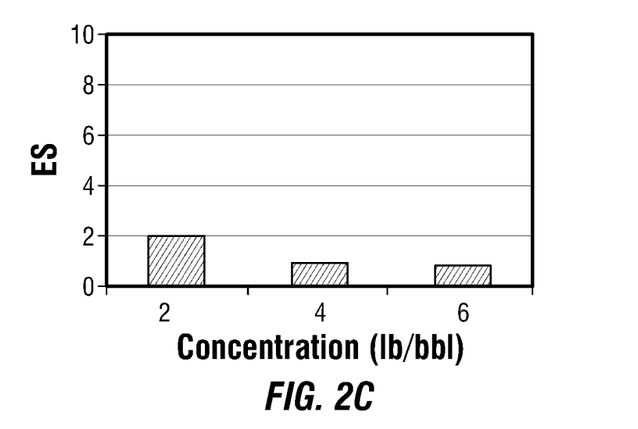
Figure 2D:
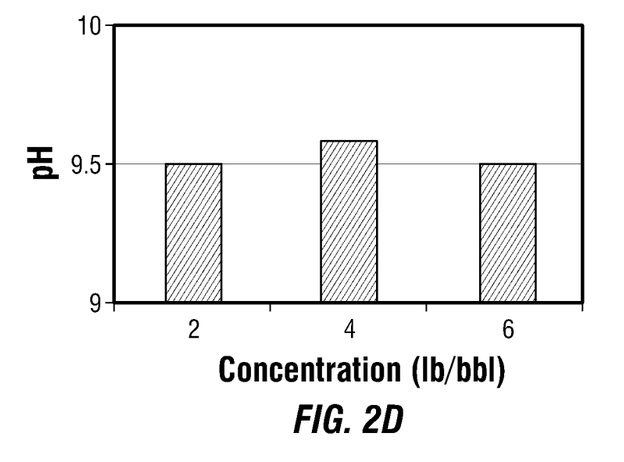
Figure 3A:
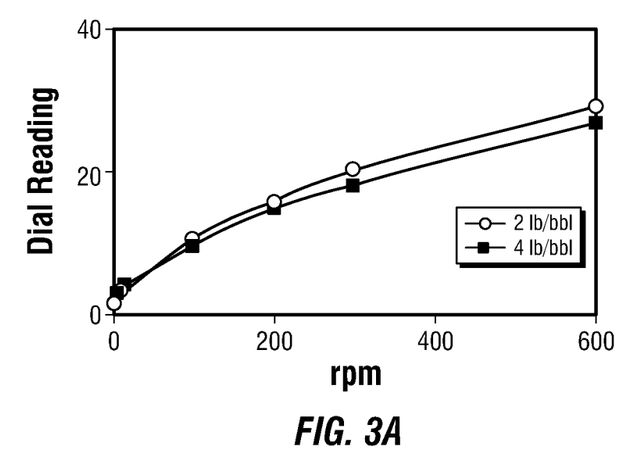
FIGS. 3A-3B depict the results of fluid testing using a disclosed direct emulsion drilling fluid 60:40 O/W ratio.
Figure 3B:
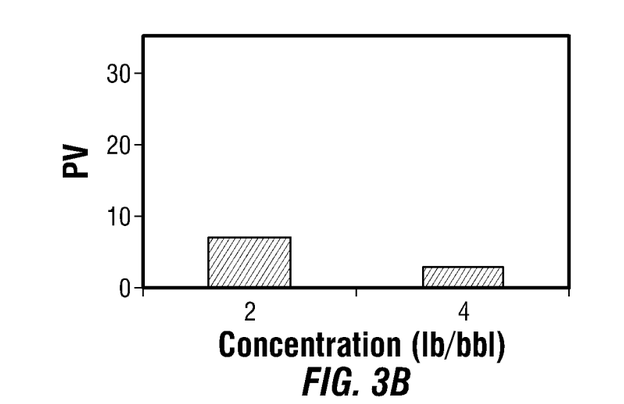

FIGS. 2A-2D depict the results of fluid testing using the example direct emulsion drilling fluid comprising polysorbate at a 60:40 O/W ratio. As indicated, the oil concentration may be higher than the water concentration. Therefore, a sufficient emulsifier is needed to ensure that a stable, water-wet fluid may be achieved. FIG. 2A depicts the rheological profile of fluids at different rpm. The rheology profile was calculated after the fluids were hot-rolled at 200° F. (93° C.) for 16 hours. Fluid rheologies were measured at 120° F. (49° C.). As shown, the rheology profile indicates that increasing the concentration of the emulsifier may result in an increasing rheological profile. However, although the rheological profile may be shown as increasing, in general, the rheological profile is still relatively low and flat. The graph also indicates that even with a low dosage of the emulsifier, good suspension was still observed (as shown with >4 dial readings even at low shear rate (i.e., lower rpm)). FIG. 2B depicts the PV plot of the fluid. As indicated, FIG. 2B shows that although increasing the concentration of the emulsifier results in a higher rheological profile (see FIG. 1A), a lower overall rheology fluid still remains. More specifically, the PV values were relatively the same for all three fluids at various concentrations. FIG. 2C depicts the ES measurements to determine water wettability. Generally, ES values <15 are water-wet, whereas ES values >15 are generally considered oil-wet. In selecting the appropriate emulsifier for the direct emulsion system, the emulsion should be stable. Moreover, the fluid should remain water-wet; thereby indicating that the oil is still in the internal phase. FIG. 2D depicts pH, wherein the fluids are all basic. Ideal pH values for this system are from about pH 9 to about pH 12. Although not shown, additional results indicate the stability of fluids may also be determined by static aging of the fluids for 24 hours after hot roll, resulting in no separation or minimal separation, wherein minimal separation may be less than 3 vol %). Accordingly, the results indicate that the stability of the fluid and its desirable fluid properties, including rheology, wettability and pH, may be a result of the polysorbate interaction with both the internal and external phase of the solution FIGS. 3A-3B depict the results of fluid testing using the example direct emulsion drilling fluid comprising polysorbate at a 60:40 O/W ratio. FIG. 3A depicts the rheology profile of the direct emulsion fluids at different dosage of the emulsifier. The results show that, similar to the previous data acquired for 60:40 O/W, the rheological profile looked flat and relatively low rheologies were observed. Increasing the concentration of the emulsifier did not show any significant changes in the rheological profile. In addition, good suspension properties were also observed for this system where the fluids show >5 dial readings even at low rpm shear rates.

The PV plot as shown in FIG. 3B also shows similar rheologies for both dosages. This signifies that the rheology did not change significantly even though the dosage of the emulsifier was increased. The wettability of the fluids was measured by determining their ES values. Similar to previous results, all samples yield water wet fluids signifying that water is in the external phase. The pH values were also taken to determine whether adding the emulsifier would result in any significant change in pH. The results show that the fluid remained within the desired basic range of pH (9-12) and that increasing the concentration of the emulsifier did not have any significant impact on the pH.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method of drilling in a subterranean formation comprising:
providing a water wet direct emulsion drilling fluid free of weighting agent with a density of about 7 lb/gal to about 12 lb/gal and a pH from about 9 to about 12 comprising an aqueous-based fluid, an oil, a viscosifying polymer, and a polysorbate emulsifier;
wherein the viscosifying polymer is present in an amount of about 0.1 lb/bbl up to about 10 lb/bbl;
wherein the viscosifying polymer has a mean particle size of about 100 nm to about 500 µm;
wherein the polysorbate emulsifier is selected from the group consisting of polyoxyethylene (20) sorbitan monolaurate, polyoxyethylene (20) sorbitan monopalmitate, polyoxyethylene (20) sorbitan monostearate, polyoxyethylene (20) sorbitan monooleate, and combinations thereof;
wherein the polysorbate emulsifier is present in an amount of about 0.10 lb/bbl to about 15 lb/bbl;
wherein the water wet direct emulsion drilling fluid is a stable water wet system in that the water wet direct emulsion has a property of no phase stratification after 24 hours at 200° F.;
circulating the water wet direct emulsion drilling fluid from a surface, through a wellbore, and back to the surface; and
extending the wellbore in the subterranean formation while circulating the water wet direct emulsion drilling fluid.

2. The method of claim 1, wherein the circulating comprises exiting the water wet direct emulsion drilling fluid through an annulus and circulating the water wet direct emulsion drilling fluid to one or more fluid processing units, wherein the fluid processing units comprise at least one fluid processing unit selected from the group consisting of a shaker, a centrifuge, a hydrocyclone, a separator, a heat exchanger, fluid reclamation equipment, and combinations thereof.

3. The method of claim 2, further comprising depositing the water wet direct emulsion drilling fluid into a retention pit, wherein the retention pit comprises a mud pit.

4. The method of claim 1, wherein the water wet direct emulsion drilling fluid further comprises at least one additive selected from the group consisting of a lubricant, a corrosion, inhibitor a shale inhibitor, a scale inhibitor, and combinations thereof.

5. The method of claim 1, wherein the aqueous-based fluid comprises a brine composition, wherein the brine composition comprises at least one salt selected from the group consisting of sodium chloride, sodium bromide, potassium bromide, potassium chloride, magnesium chloride, calcium chloride, calcium bromide, potassium formate, cesium formate, lithium chloride, lithium bromide, sodium formate, lithium formate, ammonium chloride, tetramethyl ammonium chloride, choline chloride, and mixtures thereof.

6. The method of claim 1, wherein the oil comprises at least one oil selected from the group consisting of an α-olefins, internal olefin, alkane, aromatic hydrocarbon, cycloalkane, liquefied petroleum gas, kerosene, diesel oil, crude oil, gas oil, fuel oil, paraffin oil, mineral oil, light cycle oil, tall oil, refined oil, low-toxicity mineral oil, olefin, ester, amide, synthetic oil, polydiorganosiloxane, siloxane, organosiloxane, ether, dialkylcarbonate, vegetable oil, and combinations thereof.

7. The method of claim 1, wherein the polysorbate emulsifier comprises at least one group selected from the group consisting of an alkyl group, an aryl group, and combinations thereof, and wherein the alkyl group or aryl group comprise at least one group selected from the group consisting of a methyl group, an ethyl group, a propyl group, hydroxyethyl group, a hydroxypropyl group, a tolyl group, a xylyl group, a naphthyl substituent, and combinations thereof.

8. The method of claim 1, wherein the water wet direct emulsion drilling fluid has a ratio of the oil to the aqueous-based fluid of about 90:10 to about 20:80.

9. The method of claim 8, wherein the water wet direct emulsion drilling fluid has a ratio of the oil to the aqueous-based fluid of about 80:20 to about 50:50.

10. The method of claim 1, wherein the polysorbate emulsifier comprises a total molecular weight of less than about 1000.

11. A method of drilling in a subterranean formation comprising:
providing a water wet direct emulsion drilling fluid free of weighting agent and free of surfactant with a density of about 7 lb/gal to about 12 lb/gal and a pH from about 9 to about 12 comprising an aqueous-based fluid present in an amount of about 20% by volume up to about 90% by volume; a viscosifier present in an amount of about 0.1 lb/bbl up to about 10 lb/bbl; a clay present in an amount of about 1 lb/bbl up to about 20 lb/bbl; an oil present in an amount of about 20% by volume up to about 90% by volume; a polysorbate emulsifier present in amount of about 0.1 lb/bbl up to about 15 lb/bbl, and a weighting agent;
wherein the viscosifying polymer has a mean particle size of about 100 nm to about 500 µm,
wherein the polysorbate emulsifier is the only emulsifier and is selected from the group consisting of polyoxyethylene (20) sorbitan monolaurate, polyoxyethylene (20) sorbitan monopalmitate, polyoxyethylene (20) sorbitan monostearate, polyoxyethylene (20) sorbitan monooleate, and combinations thereof;
wherein the water wet direct emulsion drilling fluid is a stable water wet system in that the water wet direct emulsion drilling fluid has a property of no phase stratification after 24 hours at 200° F.;

circulating the water wet direct emulsion drilling fluid from a surface, through a wellbore, and back to the surface; and extending the wellbore in the subterranean formation while circulating the water wet direct emulsion drilling fluid.

12. The method of claim 11, wherein the circulating comprises exiting the water wet direct emulsion drilling fluid through an annulus and circulating the water wet direct emulsion drilling fluid to a fluid processing unit, wherein the fluid processing unit comprises a shaker.

13. The method of claim 12, further comprising depositing the water wet direct emulsion drilling fluid into a retention pit, wherein the retention pit comprises a mud pit.

14. The method of claim 11, wherein the water wet direct emulsion drilling fluid further comprises a shale inhibitor.

15. The method of claim 11, wherein the aqueous-based fluid comprises a brine composition, wherein the brine composition comprises sodium chloride.

16. The method of claim 11, wherein the oil comprises diesel oil.

17. The method of claim 11, wherein the polysorbate emulsifier comprises at least one group selected from the group consisting of an alkyl group, an aryl group, and combinations thereof, and wherein the alkyl group or aryl group comprise at least one group selected from the group consisting of a methyl group, an ethyl group, a propyl group, hydroxyethyl group, a hydroxypropyl group, a tolyl group, a xylyl group, a naphthyl substituent, and combinations thereof.

18. The method of claim 11, wherein the polysorbate emulsifier comprises polyoxyethylene (20) sorbitan monolaurate.

19. The method of claim 11, wherein the aqueous-based fluid comprises a brine composition, wherein the brine composition comprises at least one salt selected from the group consisting of sodium chloride, sodium bromide, potassium bromide, potassium chloride, magnesium chloride, calcium chloride, calcium bromide, potassium formate, cesium formate, lithium chloride, lithium bromide, sodium formate, lithium formate, ammonium chloride, tetramethyl ammonium chloride, choline chloride, and mixtures thereof.

20. The method of claim 11, wherein the oil comprises at least one oil selected from the group consisting of an α-olefins, internal olefin, alkane, aromatic hydrocarbon, cycloalkane, liquefied petroleum gas, kerosene, diesel oil, crude oil, gas oil, fuel oil, paraffin oil, mineral oil, light cycle oil, tall oil, refined oil, low-toxicity mineral oil, olefin, ester, amide, synthetic oil, polydiorganosiloxane, siloxane, organosiloxane, ether, dialkylcarbonate, vegetable oil, and combinations thereof.

* * * * *